United States Patent
Shindo et al.

(10) Patent No.: US 8,945,450 B2
(45) Date of Patent: Feb. 3, 2015

(54) APPARATUS AND METHOD FOR MANUFACTURING FIBER REINFORCED PLASTIC STRUCTURE

(75) Inventors: Kentaro Shindo, Nagasaki-ken (JP); Nozomu Kawasetsu, Nagasaki-ken (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 936 days.

(21) Appl. No.: 12/612,430

(22) Filed: Nov. 4, 2009

(65) Prior Publication Data

US 2011/0100541 A1 May 5, 2011

(51) Int. Cl.
*B29C 70/36* (2006.01)
*B29C 70/44* (2006.01)
*B29C 70/54* (2006.01)

(52) U.S. Cl.
CPC .............. *B29C 70/548* (2013.01); *B29C 70/443* (2013.01)
USPC .......................................... 264/257; 264/259

(58) Field of Classification Search
CPC ................. B29C 70/44; B29C 70/443; B29C 2043/3644
USPC ................................................ 264/257, 241
See application file for complete search history.

(56) References Cited

U.S. PATENT DOCUMENTS

| | | | | |
|---|---|---|---|---|
| 2,913,036 | A | * | 11/1959 | Smith ............................ 264/102 |
| 4,622,091 | A | * | 11/1986 | Letterman ...................... 156/286 |
| 4,902,215 | A | * | 2/1990 | Seemann, III ................. 425/406 |
| 4,942,013 | A | * | 7/1990 | Palmer et al. ................. 264/511 |
| 5,665,301 | A | * | 9/1997 | Alanko .......................... 264/571 |
| 5,904,972 | A | | 5/1999 | Tunis, III et al. |
| 5,939,013 | A | * | 8/1999 | Han et al. ...................... 264/510 |
| 6,558,590 | B1 | * | 5/2003 | Stewart ......................... 264/40.5 |
| 6,630,095 | B2 | * | 10/2003 | Slaughter et al. ............. 264/510 |
| 2002/0155186 | A1 | * | 10/2002 | Walsh ............................ 425/110 |
| 2004/0140587 | A1 | * | 7/2004 | Hadley .......................... 264/257 |
| 2005/0035478 | A1 | * | 2/2005 | Sewell et al. ................. 264/102 |
| 2005/0073076 | A1 | * | 4/2005 | Woods et al. ................. 264/511 |
| 2007/0274835 | A1 | * | 11/2007 | Stiesdal ........................ 416/230 |
| 2009/0051076 | A1 | * | 2/2009 | Kofoed et al. ................ 264/258 |
| 2014/0147688 | A1 | * | 5/2014 | Corral et al. .................. 428/519 |

FOREIGN PATENT DOCUMENTS

| | | | |
|---|---|---|---|
| EP | 1859920 A1 | | 11/2007 |
| JP | 60-083826 A | | 5/1985 |
| WO | WO 2006/058541 | * | 6/2006 |
| WO | 2007098769 A1 | | 9/2007 |

OTHER PUBLICATIONS

European Search Report for European patent application No. 09175007.5, issued Jun. 22, 2010.

* cited by examiner

*Primary Examiner* — Matthew Daniels
(74) *Attorney, Agent, or Firm* — Lowe Hauptman & Ham, LLP (57) ABSTRACT

In an apparatus for manufacturing a fiber reinforced plastic structure, a cavity is formed by a first mold and a film second mold covering the first mold, and plastic is impregnated to a fiber laminate provided in the cavity in a depressurized state. The apparatus includes: a mesh plastic flow medium that is disposed on the side of the second mold and increases the volume of the plastic to be impregnated to the fiber laminate; and a plastic flow suppressing member that is disposed on the side of the first mold of the plastic flow medium, and suppresses advance of a flow front of fluid plastic injected from a main plastic supplying unit (a first plastic supplying unit).

13 Claims, 6 Drawing Sheets

PROCESS 5

APPARATUS AND METHOD FOR MANUFACTURING FIBER REINFORCED PLASTIC STRUCTURE

BACKGROUND OF THE INVENTION

1. Field of the Invention

The present invention relates to an apparatus and a method for manufacturing a fiber reinforced plastic structure that can be applied to a large structure such as an aircraft body, a vessel, a rail vehicle, and a windmill blade.

2. Description of the Related Art

Usage of fiber reinforced plastic (FRP) now ranges over various fields. A carbon fiber rod is suitably used for a fishing rod and a golf putter. A multilayer fiber reinforced plastic is suitably used for a vessel body such as a boat and a yacht. A fiber reinforced plastic having properties of being light weight and highly strong has recently been desired to be used for a large structure such as an aircraft body and a windmill blade.

For ensuring the strength and stable physical properties of this type of fiber reinforced structure, it is important to prevent entrance of foams into a fiber reinforced plastic or generation of air holes therein during manufacturing processes. In a method of flowing fluid plastic into a fiber laminate laid in a mold and impregnating the fluid plastic in the fiber layer, air holes may be generated in the plastic layer. A vacuum forming method disclosed for example in Japanese Patent Application Laid-open No. 60-83826 is known as a technique of preventing generation of air holes in a layer.

In the technique disclosed in Japanese Patent Application Laid-open No. 60-83826, vacuuming is performed on one side of a mold cavity closed by an inner surface of a mold and a vacuum film, and fluid plastic is injected from the other side. Air in the cavity is replaced with the fluid plastic, and whereby a fiber reinforced plastic structure with less foams and air holes is manufactured.

An improvement in a vacuum forming technique is necessary for this technique for distributing and allocating fluid plastic spatially uniformly to a fiber layer. Examples of such an improvement include techniques disclosed in U.S. Pat. Nos. 4,902,215 and 5,904,972.

Figure 7:
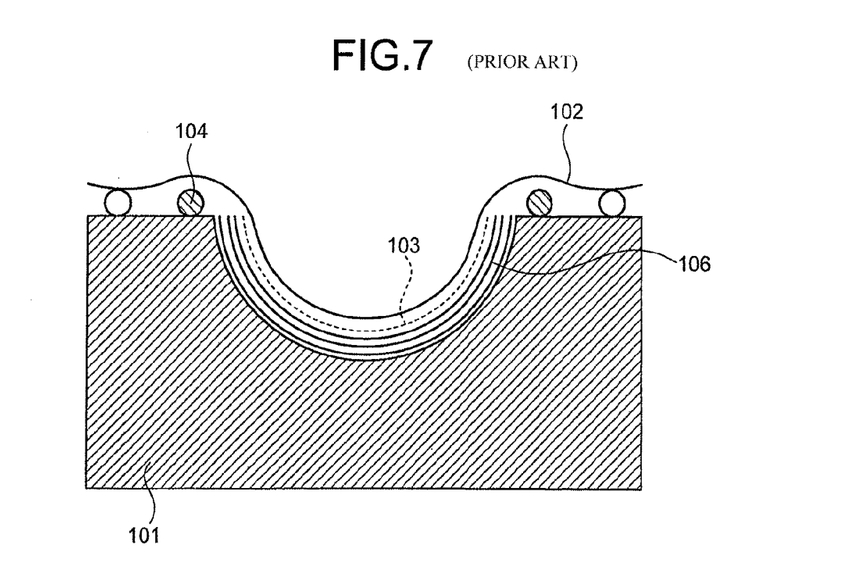
FIG. 7 is a schematic of an apparatus for manufacturing a fiber reinforced plastic structure according to a conventional technique.
Figure 8:
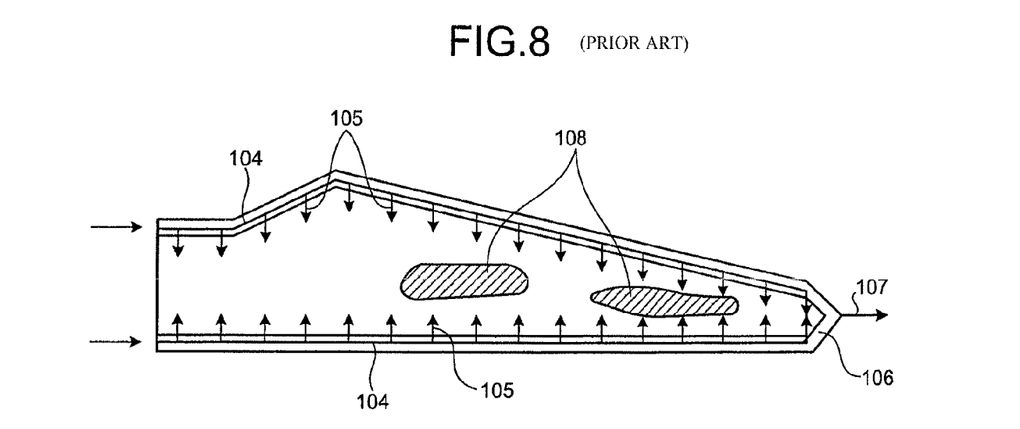
FIG. 8 is a plan view of FIG. 7.

The known techniques have in common that, as shown abstractly and schematically in FIG. 7, a plastic flow medium 103 such as a structure having grid holes, especially a nylon net, is laid on the side of the top surface of a plastic laminate 106 in a cavity formed by a mold 101 and a vacuum film 102, and as shown in FIG. 8, fluid plastic 105 is injected from a number of holes opened on a plastic injection hose 104, vacuuming 107 is performed from the edge of the cavity, and the plastic percolates the grid meshes of the plastic flow medium 103 to be impregnated to a fiber laminate 106 of the base layer. The plastic flow medium 103 is used for achieving two-dimensional diffusion uniformity of fluid plastic.

When a thick FRP product is manufactured by this technique, it is difficult to make the flow rate uniform. As shown in FIG. 8, because the fluid plastic does not flow uniformly, an unimpregnated site 108 in which no plastic is impregnated to a fiber laminate is prone to be generated, and impregnation defects are likely to occur.

Therefore, it is demanded to suppress generation of impregnation defects by improving fluidity and diffusability of an injected plastic simultaneously. It is accordingly desired to shorten a manufacturing cycle by increasing a plastic injection rate.

When the plastic flow medium 103 is used, there is a difference in diffusability of an injected plastic that flows near the plastic flow medium 103 and that flows on the side of the mold 101, and it is desired to suppress generation of impregnation defects by resolving the difference. Especially, in manufacturing a thick or a long large structure, unimpregnated parts are generated frequently. Therefore, it is desired to prevent generation of unimpregnated parts.

In view of the problems, an object of the present invention is to provide an apparatus and a method for manufacturing a fiber reinforced plastic structure that can solve generation of impregnation defects.

SUMMARY OF THE INVENTION

According to an aspect of the present invention, an apparatus for manufacturing a fiber reinforced plastic structure in which a cavity is formed by a first mold and a film second mold covering the first mold, and plastic is impregnated to a fiber laminate provided in the cavity in a depressurized state, the apparatus includes: a mesh plastic flow medium that is disposed on a side of the second mold and increases a volume of the plastic to be impregnated to the fiber laminate; and a plastic flow suppressing member that is disposed on any of a side of the first mold and the side of the second mold or both of the plastic flow medium, and suppresses advance of a flow front of fluid plastic injected from a main plastic supplying unit.

Advantageously, in the apparatus for manufacturing a fiber reinforced plastic structure, the plastic flow suppressing member is disposed near an injection port of a sub plastic supplying unit that injects plastic following the main plastic supplying unit, and on a side for suppressing a flow front of plastic that flows from the main plastic supplying unit via the plastic flow medium.

Advantageously, in the apparatus for manufacturing a fiber reinforced plastic structure, the plastic flow suppressing member is any one of a soft material, a sponge, and a member that is crashed by atmospheric pressure during vacuuming and blocks meshes of the plastic flow medium.

According to an aspect of the present invention, a method for manufacturing a fiber reinforced plastic structure includes: providing a plastic flow suppressing member at a predetermined position of a plastic flow medium; and impregnating plastic to a fiber laminate while suppressing a flow of a flow front of plastic on a side of the plastic flow medium that advances fast.

According to an aspect of the present invention, a method for manufacturing a fiber reinforced plastic structure includes: providing a plastic flow suppressing member at a predetermined position of a plastic flow medium that increases a plastic flow volume to suppress a flow of a flow front on a side of the plastic flow medium of plastic supplied from a main plastic supplying unit and advancing fast; supplying plastic subsequently from a sub plastic supplying unit after the plastic flow from the main plastic supplying unit is suppressed; and impregnating the plastic uniformly to a fiber laminate.

Advantageously, in the method for manufacturing a fiber reinforced plastic structure, the plastic flow suppressing member is any one of a soft material, a sponge, and a member that is crashed by atmospheric pressure during vacuuming and blocks meshes of the plastic flow medium.

Advantageously, in the method for manufacturing a fiber reinforced plastic structure, the fiber reinforced structure is a large structure.

DETAILED DESCRIPTION OF THE PREFERRED EMBODIMENTS

Exemplary embodiments of the present invention are explained in detail with reference to the accompanying drawings. The present invention is not limited by the embodiments. Components in the embodiments include those that can be easily conceived of by a person skilled in the art, and those that are substantially identical with the components.

First Embodiment

An apparatus for manufacturing a fiber reinforced plastic structure according to an embodiment of the present invention is explained with reference to the accompanying drawings.

Figure 1A:
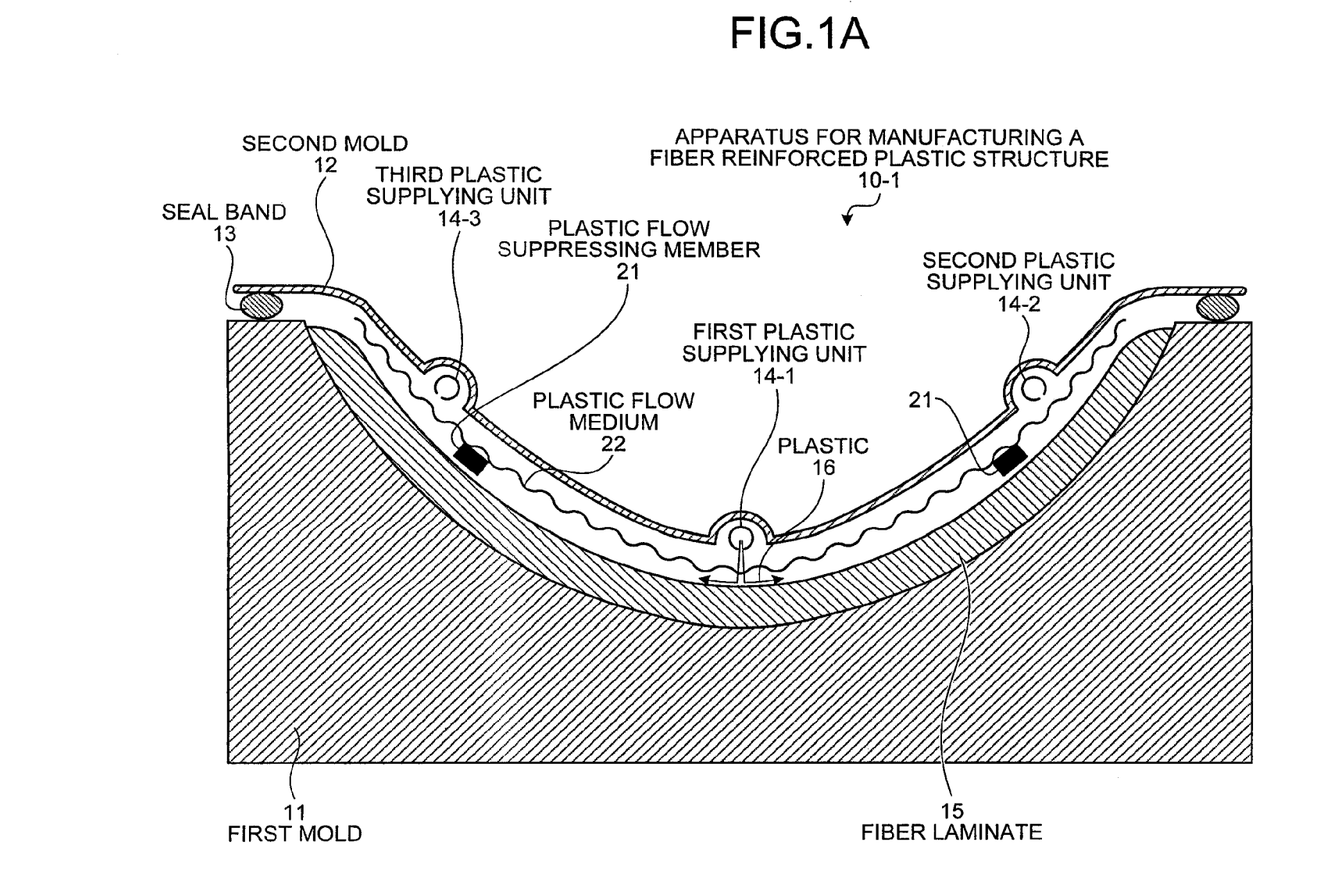
FIG. 1A is a schematic of an apparatus for manufacturing a fiber reinforced plastic structure according to an embodiment of the present invention.
Figure 1B:
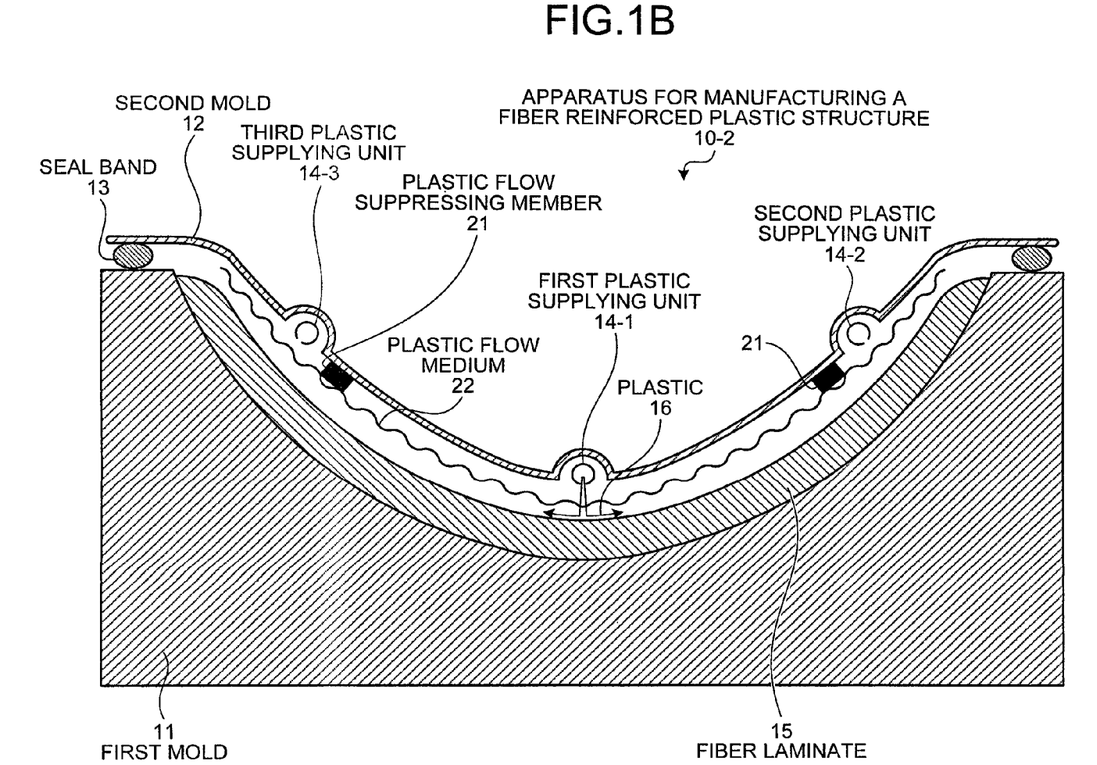
FIG. 1B is a schematic of an apparatus for manufacturing a fiber reinforced plastic structure according to another embodiment of the present invention.

FIGS. 1A and 1B are schematics of the apparatus for manufacturing a fiber reinforced plastic structure according to an embodiment of the present invention.

As shown in FIG. 1A, in the apparatus for manufacturing a fiber reinforced plastic structure according to the present embodiment, a vacuum sheet is used together with a non-deformation mold.

As shown in FIG. 1A, this apparatus 10-1 for manufacturing a fiber reinforced plastic structure includes a cavity formed by a first mold 11 and a film second mold 12 covering the first mold 11, and plastic 16 is impregnated to a fiber laminate 15 provided in the cavity at a depressurized state. The apparatus 10-1 includes a mesh plastic flow medium 22 that is provided on the side of the second mold 12 and increases a flow volume of the plastic 16 to be impregnated to the fiber laminate 15, and plastic flow suppressing members 21 that are provided on the side of the first mold 11 of the plastic flow medium 22 and suppress advance of a flow front of fluid plastic injected from a main plastic supplying unit (a first plastic supplying unit) 14-1.

In the present embodiment, a cavity is formed by the first mold 11 and the second mold 12 covering the first mold 11, and the space in the cavity is depressurized by a vacuum pump (not shown). A seal band 13 prevents air leakage.

The second mold 12 is formed by a vacuum sheet such as a transparent plastic film and a transparent plastic sheet, is freely deformable in a normal line of each surface, and is transparent or translucent. The second mold 12 is optically transparent, and a worker can adjust uniformity of diffusion of plastic while observing the state of the diffusion and controlling an injection position and an injection pressure.

In the present embodiment, first to third plastic supplying units 14-1 to 14-3 that are a plurality of plastic injection ports are arranged in the second mold 12 as shown in FIG. 1A.

In the present embodiment, the first plastic supplying unit 14-1 is a main plastic supplying unit, and the second and the third plastic supplying units 14-2, 14-3 are sub plastic supplying units that supply plastic following the main plastic supplying unit.

For example when a long and large structure is molded, supply pipes are disposed in the plastic supplying units 14-1 to 14-3 in the longitudinal direction, and the plastic injection ports are formed with predetermined intervals therebetween. Two or more sub plastic supplying units may be provided when a large structure is manufactured.

When the plastic 16 is supplied, the space in the cavity is depressurized by the vacuum pump (not shown) so that the second mold (the vacuum sheet) 12 adheres to the first to the third plastic supplying units 14-1 to 14-3. Therefore, no air leakage occurs between the second mold 12 and the first to the third plastic supplying units 14-1 to 14-3. The state before depressurization is schematically shown in FIG. 1A, and in practice, the plastic is supplied after depressurization.

The plastic 16 is impregnated to the fiber laminate 15.

In the present embodiment, the plastic flow suppressing members 21 are disposed at the bottom side of the plastic flow medium 22 (on the side of the first mold 11) upstream of plastic inflow of the second plastic supplying unit 14-2 and the third plastic supplying unit 14-3.

FIG. 1A is a cross-sectional view, and when the plastic supplying units are provided along the longitudinal direction, the plastic flow suppressing members 21 are also provided along the longitudinal direction.

The plastic flow suppressing members 21 are disposed between a peel sheet (not shown) and the plastic flow medium 22, and are separated together with the plastic flow medium 22 by peeling off the peel sheet after molding.

The plastic flow medium 22 facilitates the fluidity of fluid plastic, and for example is a mesh or a sheet having continuously arranged voids. The plastic flow medium 22 is arranged to cover the entire area or a part of the top surface of the plastic laminate 15.

The fiber laminate 15 has a multilayered laminate structure including a plurality of fiber layers and a plurality of foamed plastic layers combined with each other. The fiber of the fiber layer is for example a glass fiber, a carbon fiber, an aramid fiber, or a carbon fiber tube. The fiber layer is usually multi-layered to be strengthened. The fiber layer is formed by a matrix fiber in which fibers extend in a grid, and are woven in a matrix. The member that is required to have bending rigidity preferably includes foam sandwich between two fiber layers.

The plastic flow suppressing members 21 on the side of the first mold 11 of the plastic flow medium 22 provided on the top surface of the fiber laminate 15 suppress a flow of a flow front that advances faster on the side of the plastic flow medium 22 among plastic flow fronts formed by a plastic flow having flowed in from the main plastic supplying unit. Thus, plastic flows from the main plastic supplying unit can be matched at the side of the plastic flow front and at the side of the base side. Thereafter, by injecting plastic from the sub plastic supplying unit (the second plastic supplying unit or the third plastic supplying unit), an unimpregnated site at which plastic is not impregnated to the fiber laminate 15 is not generated. As a result, the problem of impregnation defect is solved.

The material of the plastic flow suppressing member 21 may be any one of a soft material, a sponge, and a member that is crashed by the atmospheric pressure during vacuuming, and blocks meshes of the plastic flow media 22 and a cavity formed by the second mold.

Although in the apparatus 10-1 for manufacturing a fiber reinforced plastic structure shown in FIG. 1A, the plastic flow suppressing members 21 are disposed below the plastic flow medium 22 (on the side of the first mold 11), the present invention is not limited to this configuration. As in the apparatus 10-2 for manufacturing a fiber reinforced plastic structure shown in FIG. 1B, the plastic flow suppressing members 21 may be disposed above the plastic flow medium 22 (on the side of the second mold 12). Furthermore, the plastic flow suppressing members 21 may be provided to both the side of the first mold 11 and the side of the second mold 12. Although the arrangement of the plastic flow suppressing members 21 are preferably either of those explained above, the plastic flow suppressing members 21 are particularly preferably disposed on the side of the first mold 11.

Figure 2:
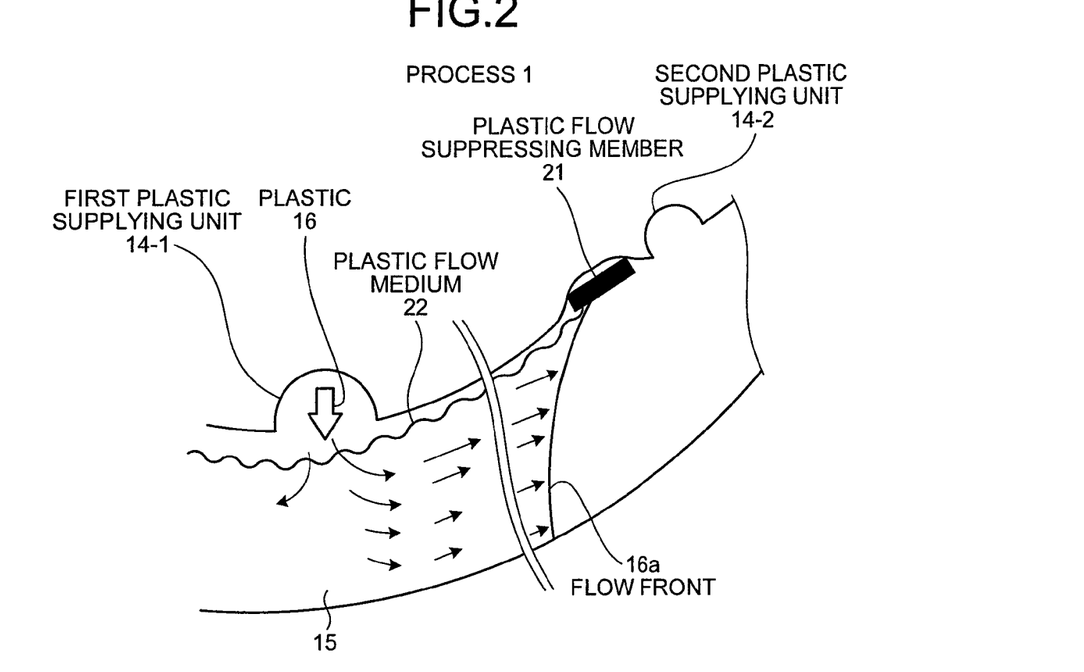
FIG. 2 is a schematic of a process 1 of a step of manufacturing a fiber reinforced plastic structure according to an embodiment of the present invention.
Figure 5:
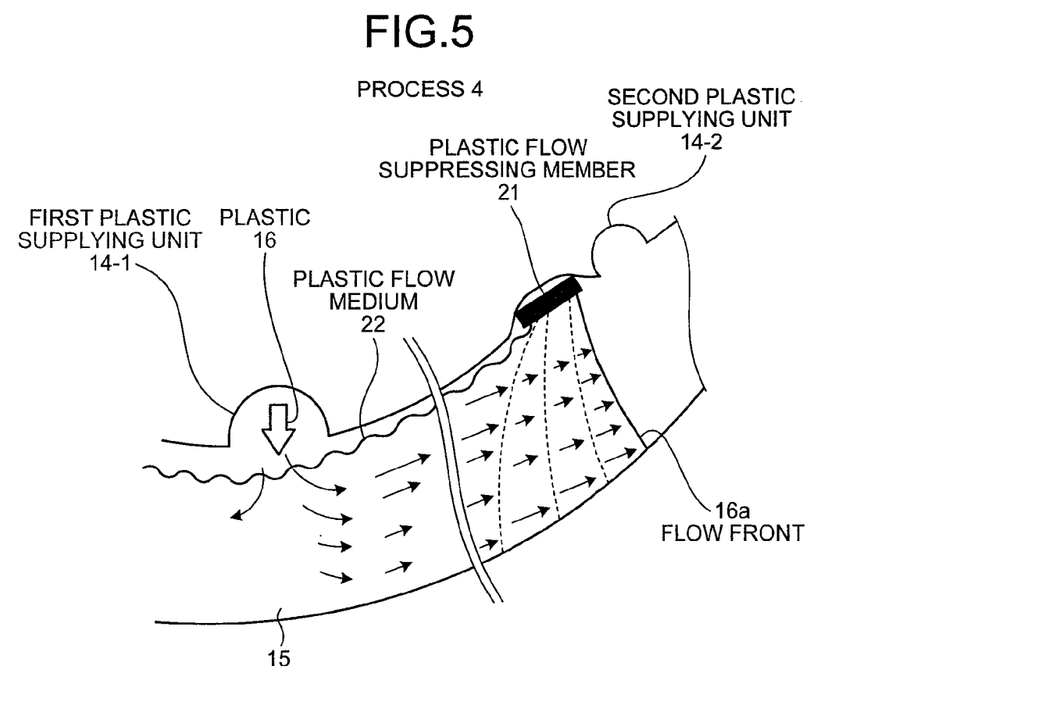
FIG. 5 is a schematic of a process 4 of the step of manufacturing the fiber reinforced plastic structure according to the embodiment.
Figure 6:
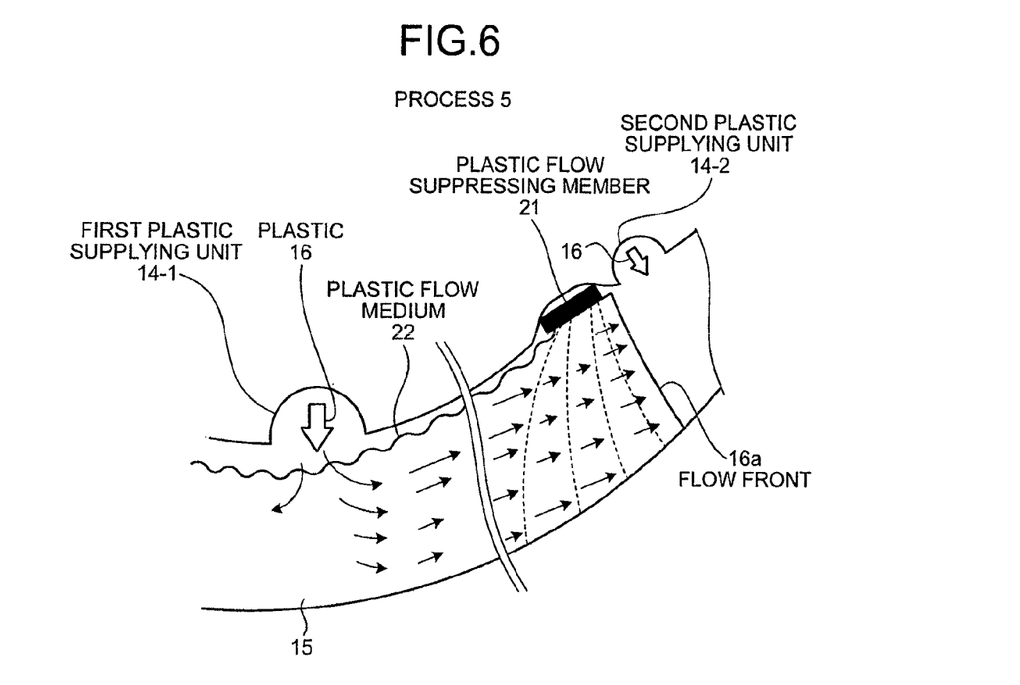
FIG. 6 is a schematic of a process 5 of a step of manufacturing the fiber reinforced plastic structure according to the embodiment.

An injection step of injecting fluid plastic into a cavity so as not to generate an unimpregnated area is explained referring to FIG. 2 (process 1) to FIG. 6 (process 5).

The plastic 16 is supplied from the plastic supplying unit 14-1 as the main plastic supplying unit to a plastic passage, and is impregnated to the plastic flow medium 22. The plastic 16 impregnated to the plastic flow medium 22 is impregnated to the fiber laminate 15.

First, in FIG. 2, the plastic 16 supplied to a supply port of the first plastic supplying unit 14-1 is supplied to the plastic flow medium 22 uniformly due to negative pressure in the cavity.

As can be seen, the space in the cavity is depressurized, and the fluid plastic 16 under the atmospheric pressure penetrates the cavity smoothly. The double flow of the fluid plastic diffuses and mixes, and furthermore infiltrate to deep layers as it permeates to the fiber laminate 15.

In the infiltration, the plastic 16 having flowed in is guided by the plastic flow medium 22. Because the fluidity of the plastic 16 is facilitated, the advance of the plastic flow front 16a closer to the plastic flow medium 22 is enhanced.

Figure 3:
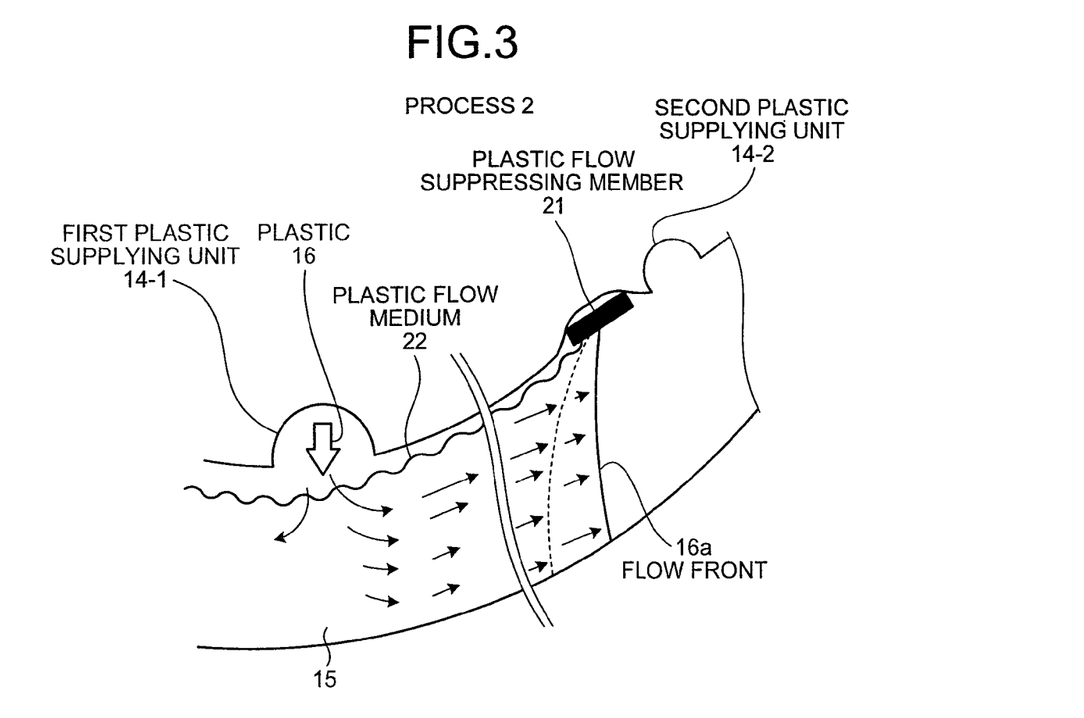
FIG. 3 is a schematic of a process 2 of the step of manufacturing the fiber reinforced plastic structure according to the embodiment.
Figure 4:
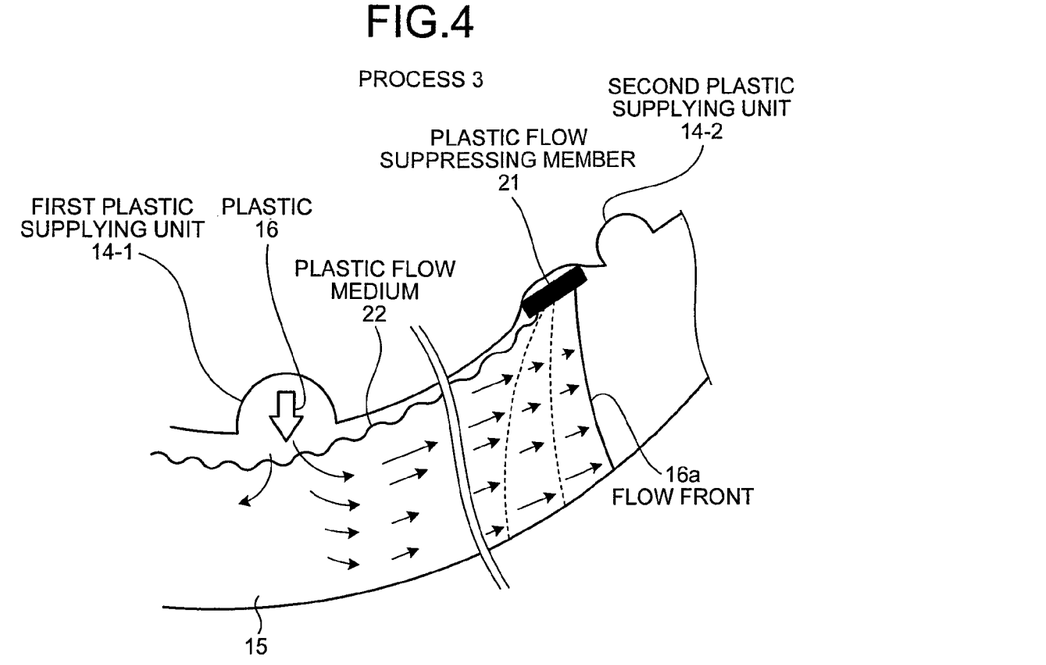
FIG. 4 is a schematic of a process 3 of the step of manufacturing the fiber reinforced plastic structure according to the embodiment.

Thereafter, as shown as a process 1 in FIG. 2, when the plastic flow front 16a advances to the point where the plastic flow suppressing member 21 is disposed, the plastic flow front 16a gradually becomes upright due to the plastic flow suppression effect of the plastic flow suppressing member 21 as sequentially shown as processes 2 to 4 in FIGS. 3 to 5.

Because the flow front 16a passes uniformly near the inlet port of the second plastic supplying unit 14-2 as the sub plastic supplying unit as shown as a process 5 in FIG. 6, generation of a plastic unimpregnated part is solved by supplying the plastic 16 from the second plastic supplying unit 14-2. Plastic injection timings of the second plastic supplying unit 14-2 and the third plastic supplying unit 14-3 as the sub plastic supplying units are different depending of the state of a plastic flow.

The fiber reinforced plastic formed in this way is cured by the room temperature or by an active heating environment while being pressed by the atmospheric pressured via the second mold (the vacuum sheet) 12, and is transformed into a hard fiber reinforced plastic structure. After the fiber reinforced plastic structure is manufactured, the second mold (the vacuum sheet) 12 is removed together with the first to the third plastic supplying units 14-1 to 14-3, the plastic flow suppressing members 21, and the plastic flow medium 22. Then, the fiber reinforced plastic structure is taken out of the first mold 11.

Although in the embodiment, the plastic flow medium 22 is removed after manufacturing the fiber reinforced plastic structure, it becomes unnecessary to remove the plastic flow medium 22 after manufacturing the fiber reinforced plastic structure by molding the structure with a glass fiber or a carbon fiber mat (felt) homogeneous with the fiber layer. In this case, the plastic flow medium 22 is completely integrated with the fiber reinforced plastic structure, and configures a part of the reinforcing member.

Thus, the manufacturing process is shortened to improve work efficiency.

Although the plastic flow medium 22 desirably has as large voidage as possible and is as thick as possible to secure a plastic passage, if it excessively thick, material properties of the fiber reinforced plastic may be lowered. Therefore, the material is selected according to the object.

According to the embodiment, the plastic flow medium 22 is arranged on the top surface of the fiber laminate 15 in manufacturing a fiber reinforced plastic structure, and the plastic flow suppressing members 21 are disposed so as to fill meshes of the plastic flow medium 22 on the side closer to where plastic flows in from the plastic supplying units 14-2, 14-3 disposed downstream of the flow of plastic supplied from the plastic supplying unit 14-1 as the main plastic supplying unit. Therefore, the flow of the flow front 16a of the fluid plastic having flowed in can be suppressed, and the fluid plastic is impregnated uniformly to the plastic laminate. As a result, a fiber reinforced plastic structure with no impregnation defects can be manufactured.

In the injection step of the present invention, diffusion of plastic supplied from the main plastic supplying unit is monitored, the opening/closing degree of the sub plastic supplying unit is controlled, and the overall flow volume can be constant with no unimpregnated sites. The control is desirably determined by a worker seeing the flow state from the outside through the transparent sheet 1.

Furthermore, although the FRP structure of the present embodiment is a plate, a complicate and large FRP structure having diverse and mixed inner/outer curves can be molded as a general characteristic of the plastic molding technique, particularly of the insert injection molding technique. Such an FRP molding method can be beneficially used for a curved structure required to have rigidity and elasticity (flexibility) at the same time, such as a boat, a yacht, a vessel, a vehicle body, an aircraft body, a vessel blade, and a windmill blade.

Test Example

The fiber laminate 15 was a glass fiber (400×500×1.24 (mm)×23 layers): permeability impregnation coefficient=$1.16 \times 10^{-11}$ ($m^2$)).

The plastic 16 was polyester plastic (viscosity: 160 mPas, gelation time: 200 min).

The plastic flow medium 22 was a nylon fishing net (400×500 mm, permeability impregnation coefficient=$2.47 \times 10^{-10}$ ($m^2$)).

The plastic flow suppressing member 21 was a sponge rubber (80×5×400 (mm)).

The plastic 16 was injected to the cavity as shown in FIG. 1A at a pressure difference of 0.1 MPa, and was impregnated to a laminate. At this time, the flow of the flow front of the plastic injected from the main plastic supplying unit was suppressed by the plastic flow suppressing member 21, and passed the second plastic supplying unit as the sub plastic supplying unit at a uniform flow. Thereafter, by injecting plastic from the second plastic supplying unit 14-2, a fiber reinforced plastic structure with no unimpregnated parts was obtained.

According to the present invention, a plastic flow suppressing member disposed at a predetermined position of a plastic flow medium that facilitates fluidity of plastic can suppress the flow of a flow front that advances fast, and the plastic can be impregnated uniformly to a fiber laminate.

As can be seen, the present invention is suited to manufacturing of a large fiber reinforced plastic structure such as an aircraft body, a vessel, a rail vehicle, and a windmill blade that can solve generation of an impregnation defect.

What is claimed is:

1. A method of manufacturing a fiber reinforced plastic structure, the method comprising:
    preparing a first mold and a second mold, wherein the second mold is configured to form a cavity with the first mold and has a plastic supplying unit through which a plastic is to be supplied;
    providing a fiber laminate on the first mold;
    providing a plastic flow medium and a plastic flow suppressing member on the fiber laminate, wherein the plastic flow medium has a mesh structure of meshes for increasing a flow volume of the plastic to be impregnated to the fiber laminate, the plastic flow suppressing member is a sponge, and the plastic flow suppressing member is provided on or below the plastic flow medium so that one part of the meshes of the plastic flow medium is blocked;
    covering the fiber laminate, the plastic flow medium and the plastic flow suppressing member on the first mold with the second mold to form the cavity between the first mold and the second mold;
    depressurizing the cavity;
    supplying the plastic from the plastic supplying unit at a depressurized state, so as to impregnate the plastic to the fiber laminate while suppressing a flow of a flow front of the plastic along a side of the plastic flow medium with the plastic flow suppressing member which is crashed at the depressurized state;
    curing the plastic so as to produce a plastic impregnated and cured fiber laminate as the fiber reinforced plastic structure; and
    removing the plastic flow suppressing member and the plastic flow medium from the fiber reinforced plastic structure,
    wherein the plastic flow suppressing member and the plastic flow medium are different products.

2. The method according to claim 1, wherein the fiber reinforced plastic structure is a large structure.

3. The method according to claim 1, wherein, at said providing the plastic flow medium and the plastic flow suppressing member on the fiber laminate, the plastic flow suppressing member is arranged between the fiber laminate and the plastic flow medium.

4. The method according to claim 1, wherein, at said providing the plastic flow medium and the plastic flow suppressing member on the fiber laminate, the plastic flow suppressing member is arranged between the second mold and the plastic flow medium.

5. The method according to claim 1, wherein
    the flow front has a first portion and a second portion, the first portion closer to the plastic flow medium than the second portion, and
    at said suppressing the flow of the flow front of the plastic with the plastic flow suppressing member, the first portion of the flow front is suppressed by the plastic flow suppressing member to have a velocity lower than a velocity of the second portion of the flow front.

6. The method according to claim 5, wherein, at said suppressing the flow of the flow front of the plastic with the plastic flow suppressing member, an angle formed between the flow of the plastic and the flow front is gradually increased toward an upright angle.

7. A method of manufacturing a fiber reinforced plastic structure, the method comprising:
    preparing a first mold and a second mold, wherein the second mold is configured to form a cavity with the first mold and has a main plastic supplying unit and a sub plastic supplying unit through which a plastic is to be supplied;
    providing a fiber laminate on the first mold;
    providing a plastic flow medium and a plastic flow suppressing member on the fiber laminate, wherein the plastic flow medium has a mesh structure of meshes for increasing a flow volume of the plastic to be impregnated to the fiber laminate, the plastic flow suppressing member is a sponge, and the plastic flow suppressing member is provided on or below the plastic flow medium so that one part of the meshes of the plastic flow medium is blocked;
    covering the plastic flow suppressing member, the plastic flow medium and the fiber laminate on the first mold with the second mold to form the cavity between the first mold and the second mold;
    depressurizing the cavity;
    supplying the plastic from the main plastic supplying unit at a depressurized state, so as to impregnate the plastic to one part of the fiber laminate while suppressing a flow of a flow front of the plastic along a side of the plastic flow medium with the plastic flow suppressing member which is crashed at the depressurized state;
    supplying plastic subsequently from the sub plastic supplying unit after the plastic flow from the main plastic supplying unit is suppressed, so as to impregnate the plastic to a remaining part of the fiber laminate;
    curing the plastic so as to produce a plastic impregnated and cured fiber laminate as the fiber reinforced plastic structure; and
    removing the plastic flow suppressing member and the plastic flow medium from the fiber reinforced plastic structure,
    wherein the plastic flow suppressing member and the plastic flow medium are different products.

8. The method according to claim 7, wherein, at said providing the plastic flow medium and the plastic flow suppressing member on the fiber laminate, the plastic flow suppressing member is arranged such that, upon said covering the first mold with the second mold, the plastic flow suppressing member is located between the main plastic supplying unit and the sub plastic supplying unit.

9. The method according to claim 8, wherein the plastic flow suppressing member is located closer to the sub plastic supplying unit than to the main plastic supplying unit.

10. The method according to claim 7, wherein, at said providing the plastic flow medium and the plastic flow suppressing member on the fiber laminate, the plastic flow suppressing member is arranged between the fiber laminate and the plastic flow medium.

11. The method according to claim 7, wherein, at said providing the plastic flow medium and the plastic flow suppressing member on the fiber laminate, the plastic flow suppressing member is arranged between the second mold and the plastic flow medium.

12. The method according to claim 7, wherein
the flow front has a first portion and a second portion, the first portion closer to the plastic flow medium than the second portion, and
at said suppressing the flow of the flow front of the plastic with the plastic flow suppressing member, the first portion of the flow front is suppressed by the plastic flow suppressing member to have a velocity lower than a velocity of the second portion of the flow front.

13. The method according to claim 12, wherein, at said suppressing the flow of the flow front of the plastic with the plastic flow suppressing member, an angle formed between the flow of the plastic and the flow front is gradually increased toward an upright angle.

* * * * *